US011719570B2

(12) United States Patent
Redding et al.

(10) Patent No.: US 11,719,570 B2
(45) Date of Patent: Aug. 8, 2023

(54) METHODS AND APPARATUSES FOR ACOUSTIC DETECTION USING TEMPORARY BRILLOUIN GRATINGS (71) Applicant: The Government of the United States, as represented by the Secretary of the Navy, Washington, DC (US)

(72) Inventors: Brandon Redding, Washington, DC (US); Allen Davis, Falls Church, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 425 days.

(21) Appl. No.: 16/580,852

(22) Filed: Sep. 24, 2019

(65) Prior Publication Data
US 2020/0096385 A1 Mar. 26, 2020

Related U.S. Application Data (60) Provisional application No. 62/735,327, filed on Sep. 24, 2018.

(51) Int. Cl.
*G01H 9/00* (2006.01)
(52) U.S. Cl.
CPC .................. *G01H 9/004* (2013.01)
(58) Field of Classification Search
CPC ........................................ G01H 9/004

USPC ......................................................... 73/653
See application file for complete search history.

(56) References Cited

U.S. PATENT DOCUMENTS

| 4,162,397 A * | 7/1979 | Bucaro | G01H 9/004 367/149 |
| 2005/0213869 A1* | 9/2005 | Brown | G01M 11/39 385/12 |
| 2013/0018633 A1* | 1/2013 | Amiri Farahani | G01D 5/35364 702/189 |

* cited by examiner

*Primary Examiner* — Tarun Sinha
(74) *Attorney, Agent, or Firm* — US Naval Research Laboratory (57) ABSTRACT

Method and apparatuses for acoustic sensing using an optical fiber are provide. An optical fiber sensor for acoustic sensing includes an optical fiber, a laser, a pump laser pulse generator, a probe laser pulse generator, a controller, and a detector. The pump laser pulse generator is configured to receive a laser beam, from the laser, and generate a pump laser pulse. Similarly, the probe laser pulse generator is configured to receive the laser beam and generate a plurality of probe laser pulses. The controller is constructed to control the pump laser pulse generator and the probe laser pulse generator to inject the pump laser pulse and the plurality of probe laser pulses, respectively, into the optical fiber at specific timings so as to generate a plurality of Brillouin gratings at a predetermined spacing. The detector is configured to receive reflected pump laser pulses from the plurality of Brillouin gratings, respectively, and provide the reflected pump laser pulses to the controller. The duration of the pump laser pulse is greater than a duration of a probe laser pulse.

7 Claims, 10 Drawing Sheets

METHODS AND APPARATUSES FOR ACOUSTIC DETECTION USING TEMPORARY BRILLOUIN GRATINGS

BACKGROUND

Field of the Invention

The present application relates generally to Brillouin grating enabled distributed fiber acoustic sensors.

Description of Related Art

Figure 1A:
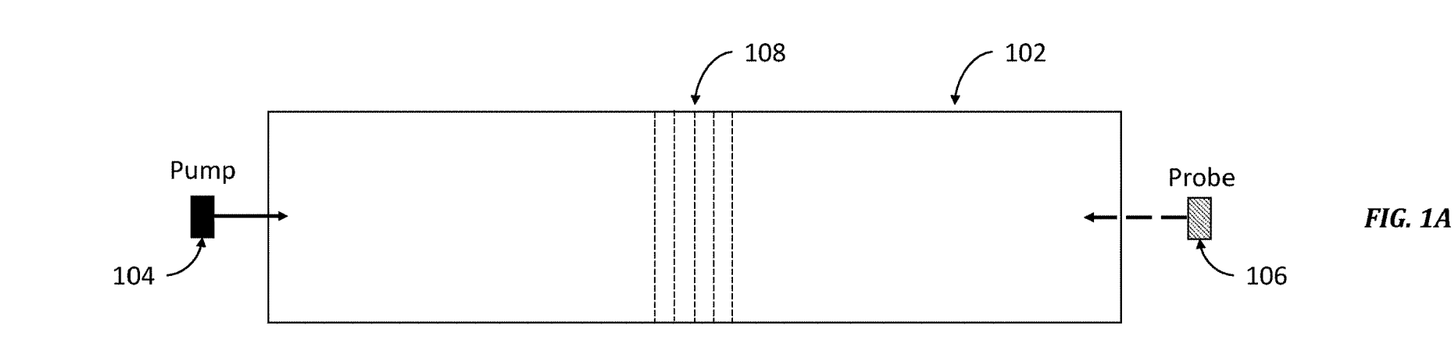
FIGS. 1A-1B illustrate the generation of a Brillouin grating.
Figure 1B:
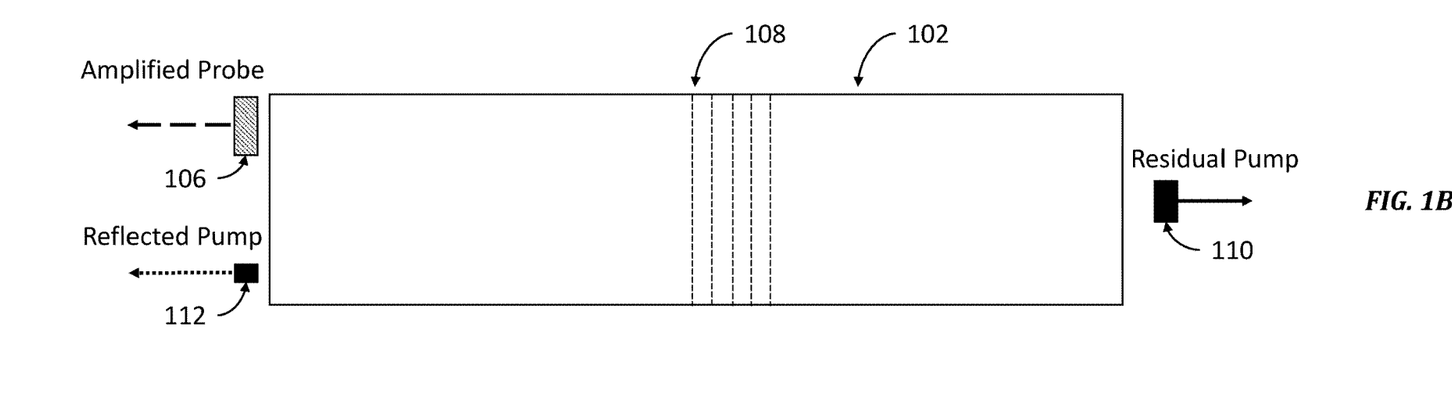

Fiber optic cables are widely used for transmitting information from one location to another. However, fiber optical cables can also be used to detect temperature and strain changes along the length of the cable itself. There are several techniques for measuring temperature and strain change that take advantage of Brillouin scattering. Brillouin scattering is where light is scattered by an acoustic wave. While Brillouin scattering can occur spontaneously, in sensing applications Brillouin scattering is stimulated by design. FIGS. 1A-B illustrate stimulated Brillouin scattering. In FIG. 1A, a pump laser pulse 104 and a probe laser pulse 106 are injected into an optical fiber 102. The pump laser 104 has a frequency $f_0$ and the probe laser has a frequency $f_0-f_{SBS}$, where $f_{SBS}$ is the stimulated Brillouin scattering frequency and is given by $$f_{SBS} = \frac{2nV_A}{\lambda},$$

where n is the refractive index of the fiber optic, $V_A$ is acoustic velocity of the medium, and $\lambda$ is the wavelength of the probe laser 104. At the point where the pump laser 104 and the probe laser 106 meet an acoustic grating 108 is generated. The acoustic grating 108 will propagate through the optical fiber 102 in the direction of travel of the pump laser 104 at the acoustic velocity of the medium. As illustrated in FIG. 1B, a portion of the pump laser 104 will reflect off of the acoustic grating 108 forming a reflected pump beam 112. Due to the Doppler effect the frequency ($f_{reflected}$) of the reflected pump beam 112 is decreased and will match the frequency of the probe. In conventional systems designed to detect changes in strain and temperature, the reflected pump beam 112 is measured as a function of the frequency offset between the pump and probe in order to estimate the Brillouin frequency shift (BFS) at distinct locations in the fiber. Since the BFS is proportional to temperature and tensile strain, this technique has been successfully used in a variety of structural health monitoring applications. However, this is a relatively slow process and most existing Brillouin based sensors do not provide sufficient bandwidth for acoustic sensing applications. In addition, the BFS has a relatively weak strain dependence, which precludes existing Brillouin based fiber sensors from achieving the sensitivity required for acoustic detection. It would be desirable to have systems and techniques that could use Brillouin scattering for acoustic sensing.

SUMMARY OF THE INVENTION

One or more of the above limitations may be diminished by structures and methods described herein.

In one embodiment, an optical fiber sensor is provided. The sensor includes an optical fiber, a laser, a pump laser pulse generator, a probe laser pulse generator, a controller, and a detector. The pump laser pulse generator is configured to receive a laser beam, from the laser, and generate a pump laser pulse. Similarly, the probe laser pulse generator is configured to receive the laser beam and generate a plurality of probe laser pulses. The controller is constructed to control the pump laser pulse generator and the probe laser pulse generator to inject the pump laser pulse and the plurality of probe laser pulses, respectively, into the optical fiber at specific timings so as to generate a plurality of Brillouin gratings at a predetermined spacing. The detector is configured to receive reflected pump laser pulses from the plurality of Brillouin gratings, respectively, and provide the reflected pump laser pulses to the controller. The duration of the pump laser pulse is greater than the duration of a probe laser pulse.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are Brillouin grating enabled distributed fiber acoustic sensors.

Figure 2A:
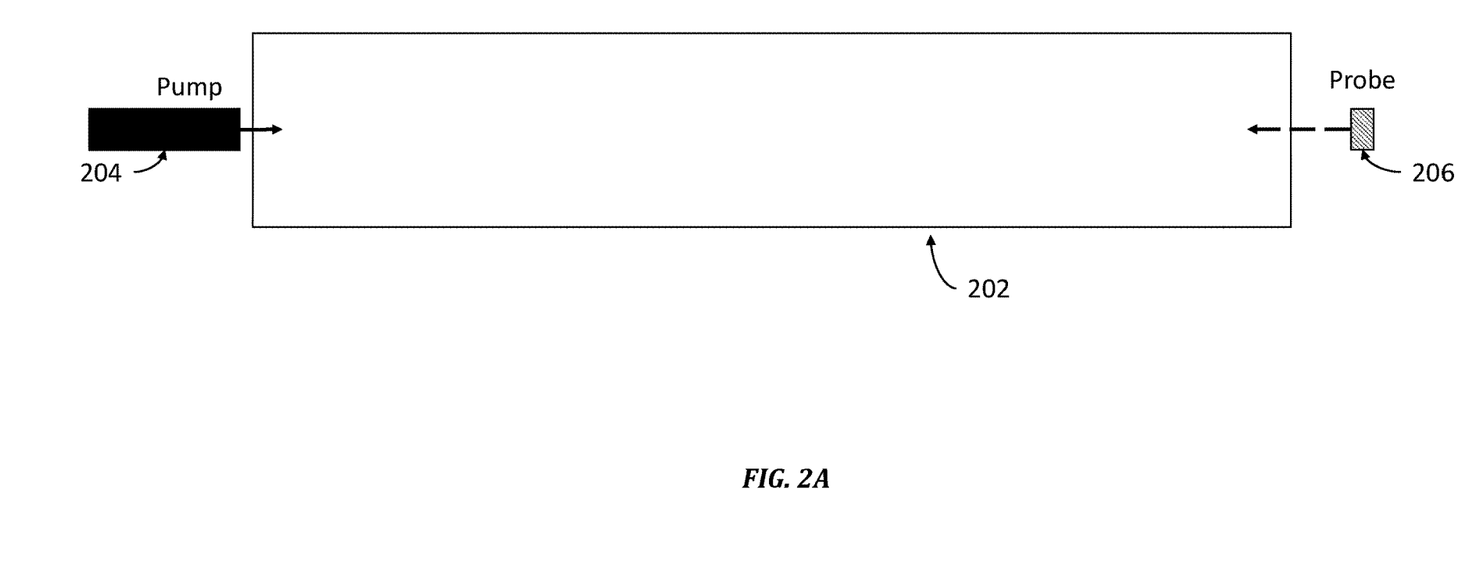
FIGS. 2A-C illustrate the generation of a Brillouin grating using a pump laser pulse that is longer than a probe laser pulse.
Figure 2B:
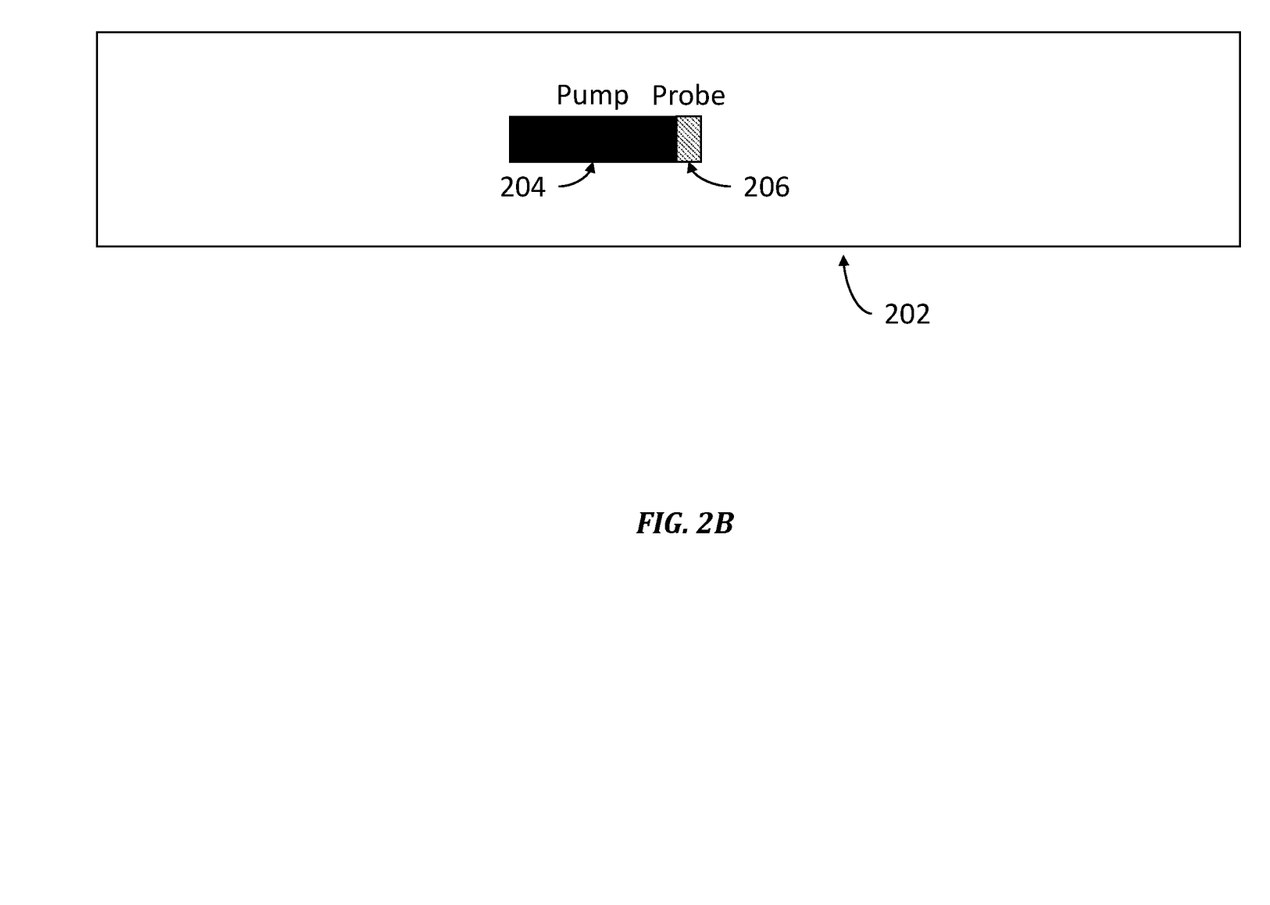
Figure 2C:
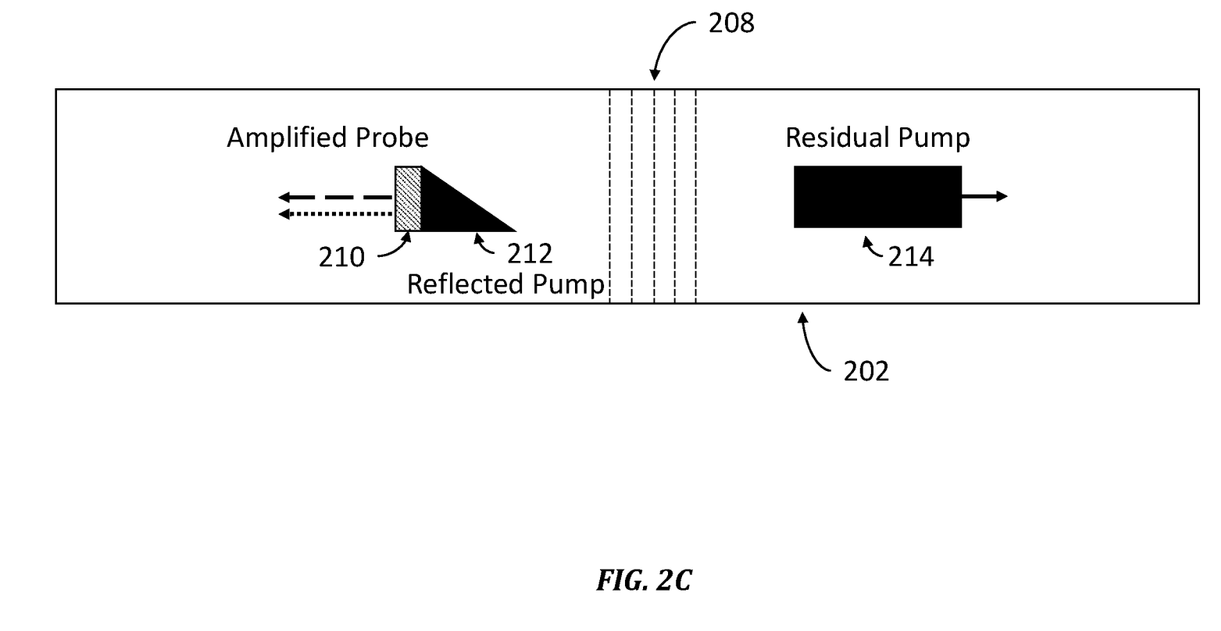
Figure 3:
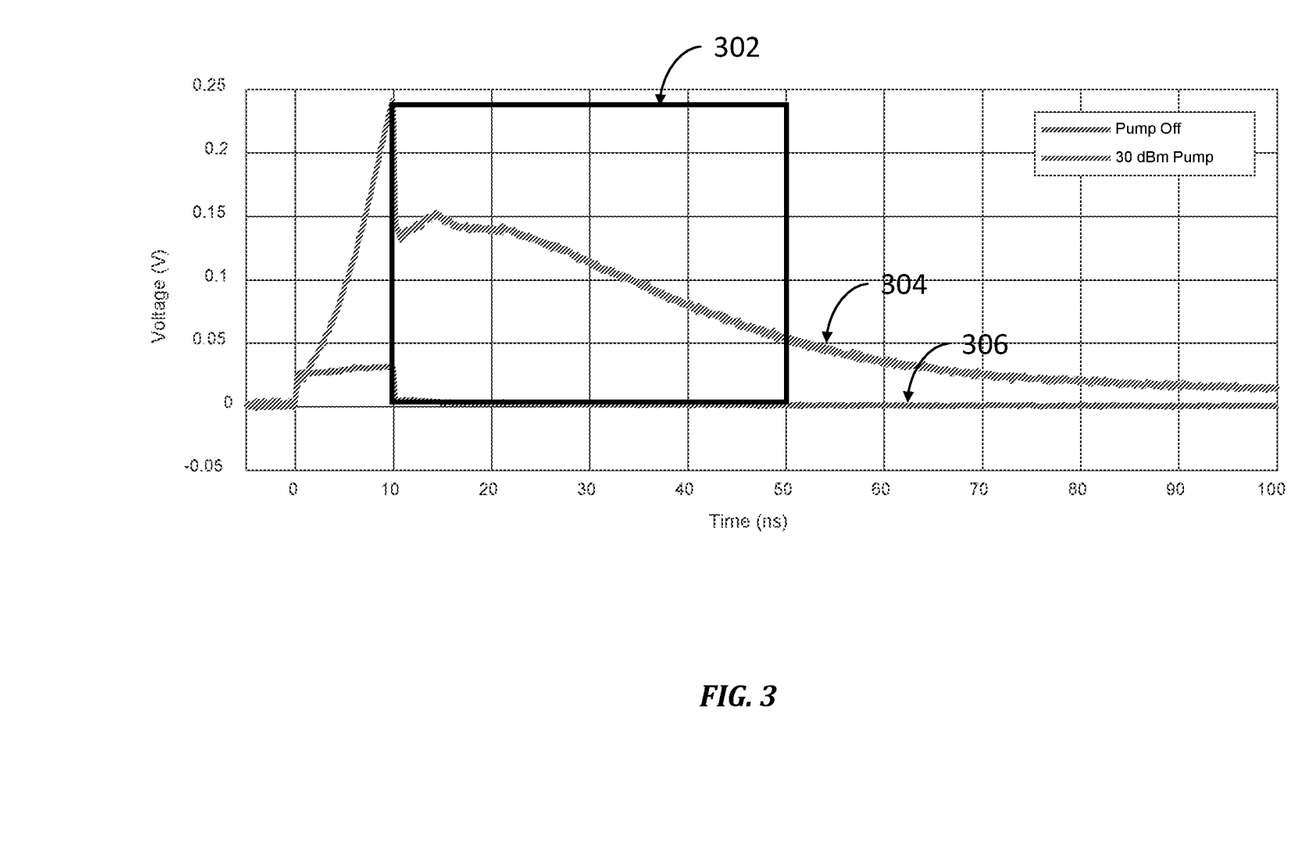
FIG. 3 is a graph illustrating the decay of a temporary Brillouin grating created by the techniques illustrated in FIGS. 2A-C.

FIGS. 2A-C illustrates an exemplary process of creating and using temporary Brillouin gratings for acoustic sensing purposes. First, a pump laser pulse 204 and a probe laser pulse 206 are injected into a fiber optic 202, which is preferably a single mode fiber. The durations of the pump laser pulse 204 and the probe laser pulse 206 are controlled such that the duration of the pump laser pulse 204 is longer the probe laser pulse 206. For example, in one embodiment, the pump laser 204 may be a 100 ns pulse and the probe laser pulse 206 may be a 10 ns pulse. The wavelengths of these pulses may be any such wavelength where the fiber optic 202 is transparent and low loss. In a preferred embodiment, the wavelengths are in the telecommunications C-band (between 1530-1565 nm, inclusive) where transmission losses are lowest. FIG. 2B illustrates the moment when the pump laser pulse 204 and the probe laser pulse 206 meet within the optical fiber 202. At that point, a Brillouin grating 208 is formed, as illustrated in FIG. 2C. The probe laser pulse 206 is amplified resulting in an amplified probe pulse 210. More important, however, is that because the pump laser pulse 204 is longer than the probe laser pulse 206, some of the pump laser pulse 204 reflects off of the Brillouin grating 208 after the probe laser pulse 206 is gone and travels back as a reflected pump pulse 212. The reflected pump pulse 212 is represented as a triangle in FIG. 2C because the amplitude of the pulse decreases with time. This is due to the fact that the Brillouin grating 208 is only temporary. While some of the pump laser pulse 204 is reflected to form the reflected pump pulse 212, the remaining pump laser pulse 204 continues to propagate as a residual pump pulse 214. FIG. 3 illustrates the decay of grating 208 over time.

FIG. 3 is a plot of amplitude versus time for a detector recording the amplified probe 210 and the reflected pump pulse 212. In the context of FIG. 2C, the detector would be located on the left side of fiber 208 in FIG. 2C. Note that since the probe and reflected pump light are at the same frequency, the detector cannot differentiate between these signals but rather measures the sum of both signals. With the pump pulse off (i.e., not transmitted), the detector records only the 10 ns probe pulse (plot 306). In that instance no Brillouin grating is formed since the pump pulse is absent. However, when the pump laser pulse 204 and the probe laser pulse 206 are provided, and an Brillouin grating 208 is formed, the power reaching the detector increases rapidly during the 10 ns when the amplified probe pulse 210 is present indicating that the Brillouin grating 208 is gaining strength and reflecting an increasing fraction of the pump laser pulse 204 (plot 304). At the end of 10 ns, the amplified probe pulse 210 has completely passed through the fiber 202 and any light reaching the detector is the result of the pump laser pulse 204 being reflected by the Brillouin grating 208 in the form of a reflected pump pulse 212. The gradual decay after the probe is gone indicates that the grating continues to reflect pump light for ~50 ns.

Figure 4A:
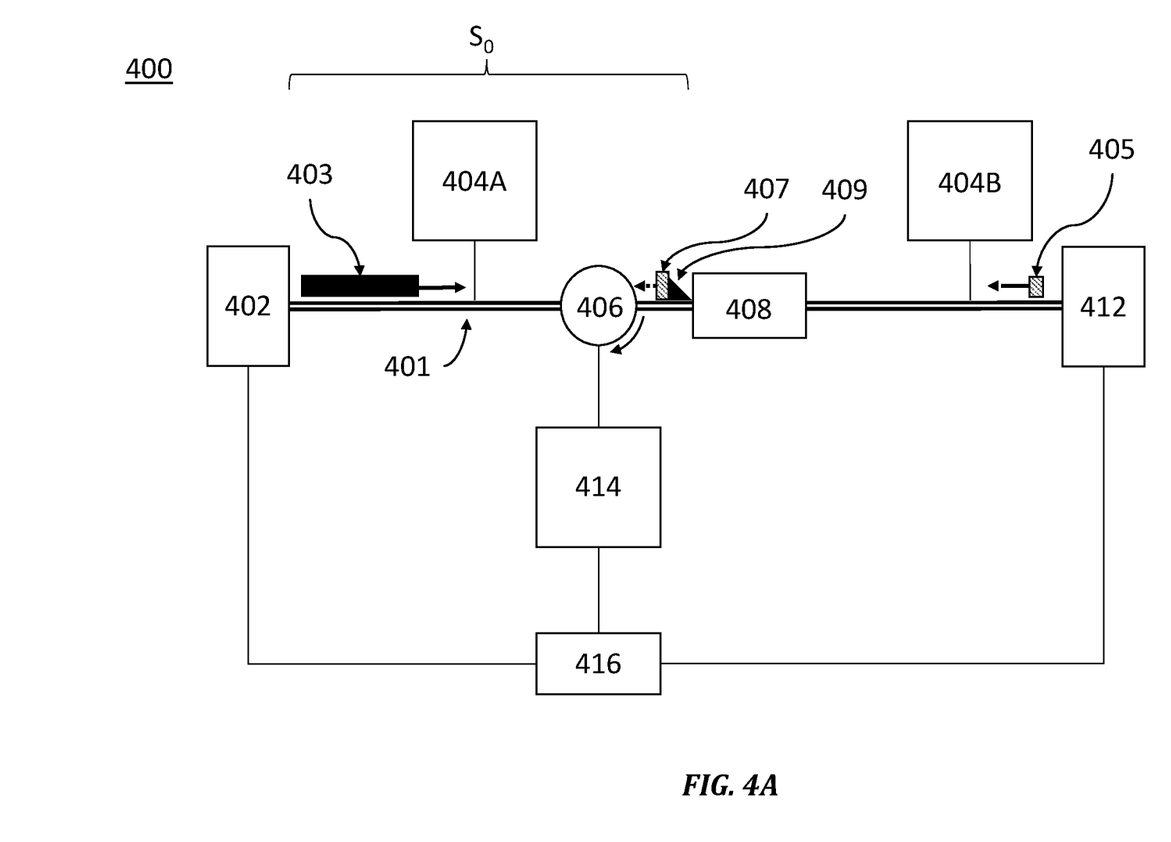
FIG. 4A is a schematic view of another system for acoustic sensing according to one embodiment.

FIG. 4A shows a single sensor system 400 constructed based on the principles discussed above and illustrated in FIGS. 2A-C. In system 400, a pump laser generator 402 and a pulse laser generator 412 are provided and operated under the control of a controller 416. As discussed below in reference to FIG. 6, it is possible for one laser to be used to generate both the pump and pulse lasers. In that embodiment, elements 402 and 412 would receive a laser beam from a laser and generate laser pulses at specific timing dictated by controller 416. In that embodiment, the frequency of the laser reaching either the pump or probe would be frequency shifted appropriately. Controller 416 may be a microcontroller, microcomputer, or a processor. Controller 416 is operably connected to memory (not shown) that stores a control program that, when executed, provides for overall control of system 400. In addition, the memory also receives and stores data from detector 414 (as described below) as well as the results of computations performed on such data in accordance with the control program. Such control program includes code to perform the methods described below.

Under the control of controller 416, the pump laser generator 402 and the probe laser generator 412 inject a pump laser pulse 403 and a probe laser pulse 405 into an optical fiber 401. In a preferred embodiment, the optical fiber 401 is a single mode fiber. The pump laser pulse 403 is provided to a circulator 406A. As one of ordinary skill will appreciate, a circulator is an optical element that allows light entering from one port to exit at the next port, and only the next port, in the circulation. Thus, in the embodiment shown in FIG. 4A, pump pulse 403 enters the circulator 406 from the left and exits at the right in the direction of element 408. Circulator 406 will not allow the pump pulse 403 to travel directly to the detector 414. As described above, at the point where the pump pulse 403 and the probe pulse 405 meet, a Brillouin grating 408 is created. The Brillouin grating 408 results in an amplification of the probe pulse, generating an amplified probe pulse 407. The longer duration pump pulse 403 reflects off the Brillouin grating 408 to form a reflected pump pulse 409 whose amplitude, like the reflected pump pulse 212 in FIG. 2C, decreases with time due to the dissipation of the Brillouin grating 408.

In FIG. 4A, two external electro-optical modulators (EOM) 404A and 404B are provided to represent external sources to be detected. EOM 404A operates to modulate pump pulse 403 to carry a 150 MHz sinusoidal signal. Similarly, EOM 404B operates to modulate probe pulse 405 to carry a 150 MHz sinusoidal signal. By performing measurements with either EOM 404A active or EOM 404B active, the sensitivity of the system 400 to simulated acoustic signals before and after the Brillouin grating 408 can be identified. The amplified probe pulse 407 and the reflected pump pulse 409 are provided to circulator 406 which directs them to a detector 414. The amplified probe 407 and reflected pump 409 are combined with a local oscillator on the detector. Detector 414 converts the incident light to a digital data signal which is provided to controller 416 for analysis. In a preferred embodiment, detector 414 may be an amplified photodetector, a simple biased photodetector, a transimpedance photodetector, or a PIN amplified photodetector. If the amplified probe 407 (or reflected pump 409) are sensitive to the phase modulation introduced by the EOMs in the two regions of the fiber, the detector 414 will record a 150 MHz modulation signal due to interference with the local oscillator.

Figure 4B:
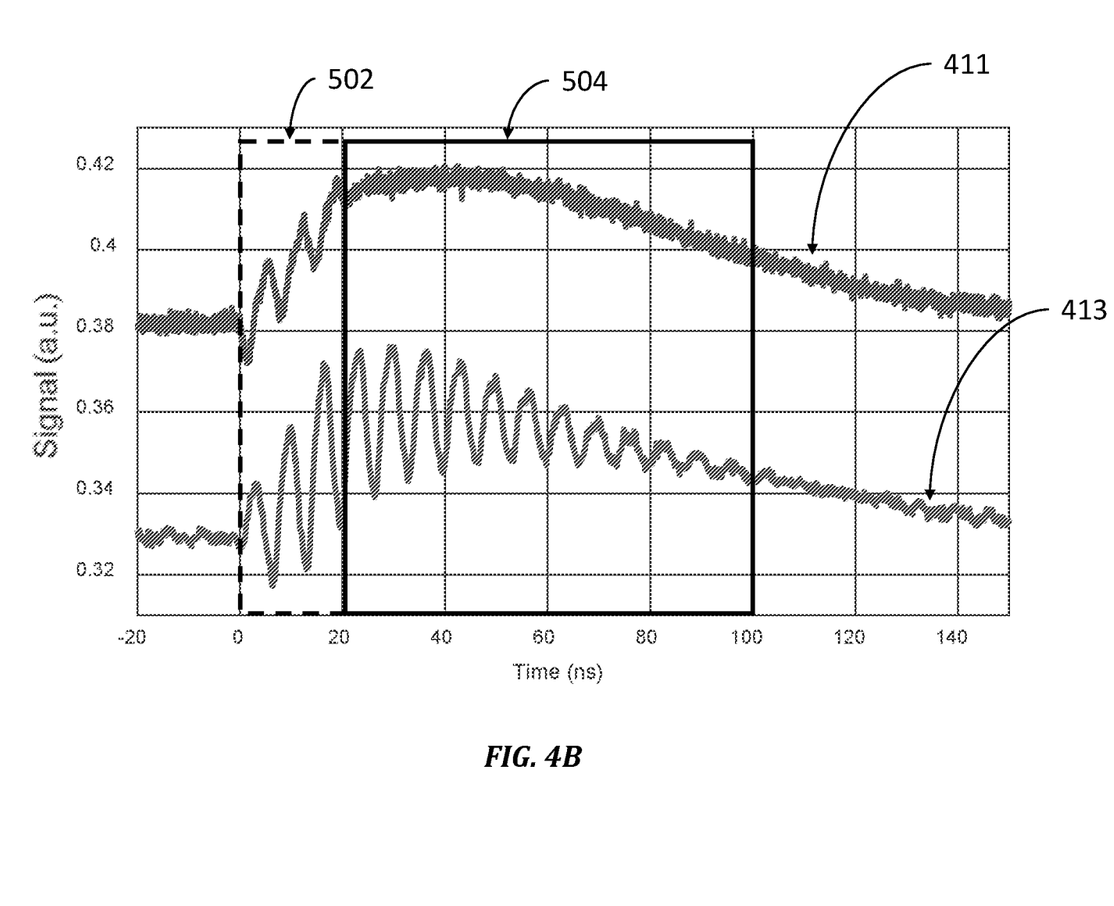
FIG. 4B is a graph illustrating the signal impinging on a detector of the system illustrated in FIG. 4A.

FIG. 4B is a plot of signal strength versus time as recorded by detector 414. The zero value on the x-axis indicates the moment in time when the detector 414 began receiving the amplified probe signal and the reflected pump signal. FIG. 4B can be divided into two regions 502 and 504. The first region 502 corresponds to the time period of the amplified probe signal 407 (20 ns), while the second region 504 corresponds to a time period that begins at the end of the amplified probe signal 407 and lasts for the remaining duration of the reflected pump pulse 409. The first measurement 411 was recorded with EOM 404B turned on, while the second measurement 413 was recorded with EOM 404A turned on. As can be seen in FIG. 4B, the amplified probe and reflected pump detected in region 502 are sensitive to both EOM 404A and EOM 404B. This indicates that in this region, the sensor cannot make a localized measurement—the measured light is sensitive to acoustic signals to the left and right of the Brillouin grating 408. In region 504, the detector 414 only sees reflected pump 409 since the 20 ns period of the amplified probe 407 is no longer present. In this region, the detected light is only sensitive to EOM 404A (measurement 413), but does not show any modulation from EOM 404B (measurement 411). This confirms that the light detected in this region carriers information about the phase accumulated in the fiber leading up to the grating, but not beyond it. By repeating this type of measurement using a series of gratings along the fiber, it is possible to perform distributed, localized acoustic measurements by monitoring the relative phase between pump light reflected from sequential gratings.

As used in this configuration, an external signal (such as 404A) capable of modifying the pump pulse 403 and acting on a region of the optical fiber 401 between the pump pulse generator 402 and the Brillouin grating 408 ($S_0$) can be detected in the reflected pump signal 409 for the duration of the Brillouin grating 408. Importantly, it is not necessary to measure the Brillouin frequency shift (BFS) to detect the external source. Because the external source directly modulates the pump pulse 403, the mere detection of that modulation in the reflected pump signal 409 is sufficient to reveal the presence of the external source (EOM 404A in the case of FIG. 4A). In fact, it is undesirable to detect the changes in the BFS that may be induced by the external source 404A as that process is too slow and insensitive for acoustic sensing purposes. Rather, the technique described above allows for much quicker identification of the external source in the reflected pump signal 409. Having described a single sensor implementation, attention will now be directed to a multiple sensor implementation.

Figure 5A:
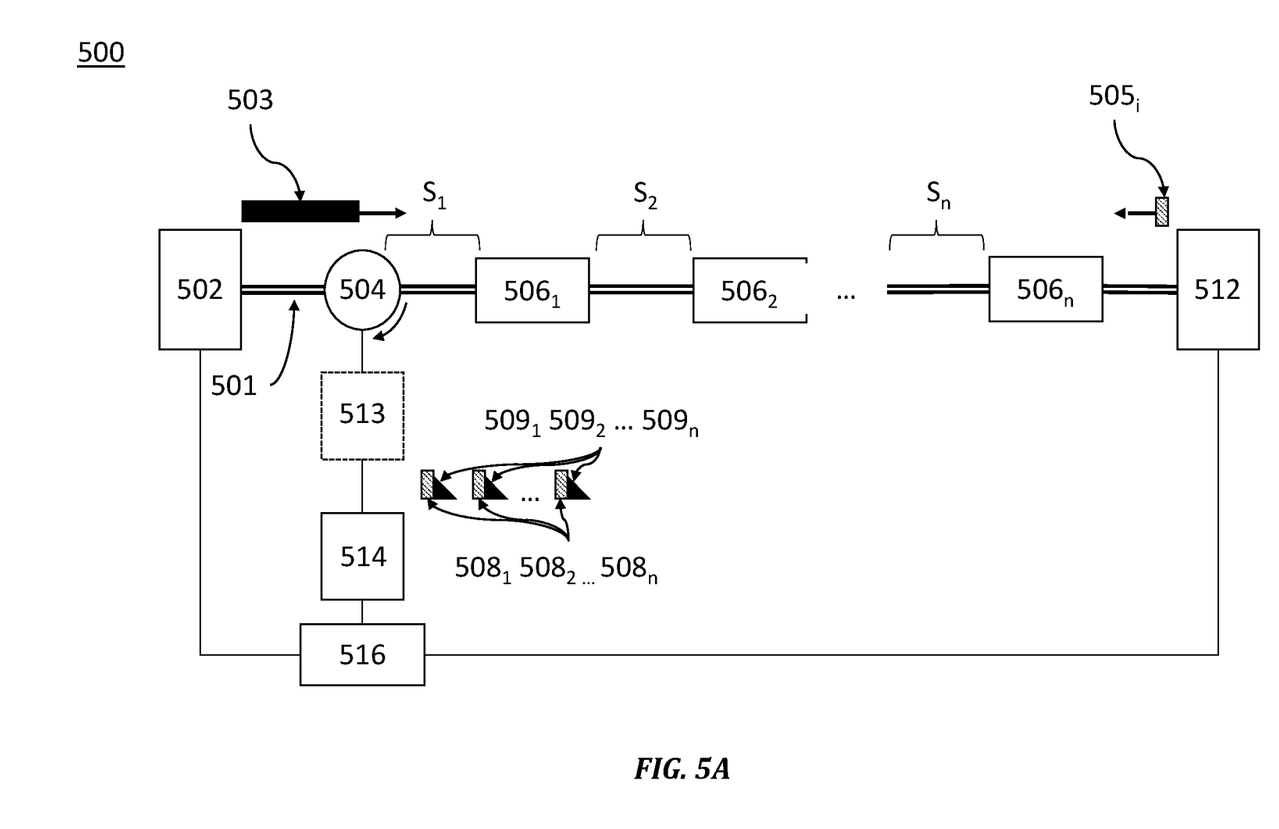
FIG. 5A is a schematic view of a system for acoustic sensing according to another embodiment.

FIG. 5A illustrates a system 500 for detecting external sources from a plurality of regions of an optical fiber. Like system 400, a pump laser 502 and a probe laser 512 are provided and connected to an optical fiber 501. Pump laser 502 and probe laser 512 are operably connected to a controller 516. Controller 516 is operably connected to memory (not shown) that stores a control program that, when executed, provides for overall control of system 500. In addition, the memory also receives and stores data from detector 514 (as described below) as well as the results of computations performed on such data in accordance with the control program. Such control program includes code to perform the methods described below. Under the control of a controller 516, pump laser 502 injects a pump laser pulse 503 into the optical fiber 501. Controller 516 also controls the injection of a plurality of probe laser pulses $505_1$, $505_2$, ... $505_n$ into the optical fiber 501 from probe laser 512. As discussed above, in another embodiment, a single laser source may provide a laser beam to elements 502 and 512. In that embodiment, elements 502 and 512 act as pump and probe laser pulse generators that are configured to receive the laser beam for the laser source and inject the same into the optical fiber at the appropriate timings, as directed by controller 516 in accordance with the method described below.

In FIG. 5A, the number of probe laser pulses $505_i$ is equal to the number of sensor regions desired along the length of the optical fiber 501. As described above in reference to FIG. 2C, some of the pump laser pulse 403 is not reflected by the first Brillouin grating and continues to propagate in the same direction through the optical fiber 501 as a residual pump pulse 507. The residual pump pulse 507 may interact with additional probe laser pulses to create additional Brillouin gratings which, like Brillouin grating 408 described above, act as temporary mirrors to reflect portions of the pump laser pulse 403. The distance between any two such Brillouin gratings therefore corresponds to a sensing region. The manner in which the pump laser pulse and the probe laser pulses are injected into the optical fiber 501 to establish the multiple sensing regions through multiple Brillouin gratings is illustrated in FIGS. 5B-E.

Figures 5B, 5C:
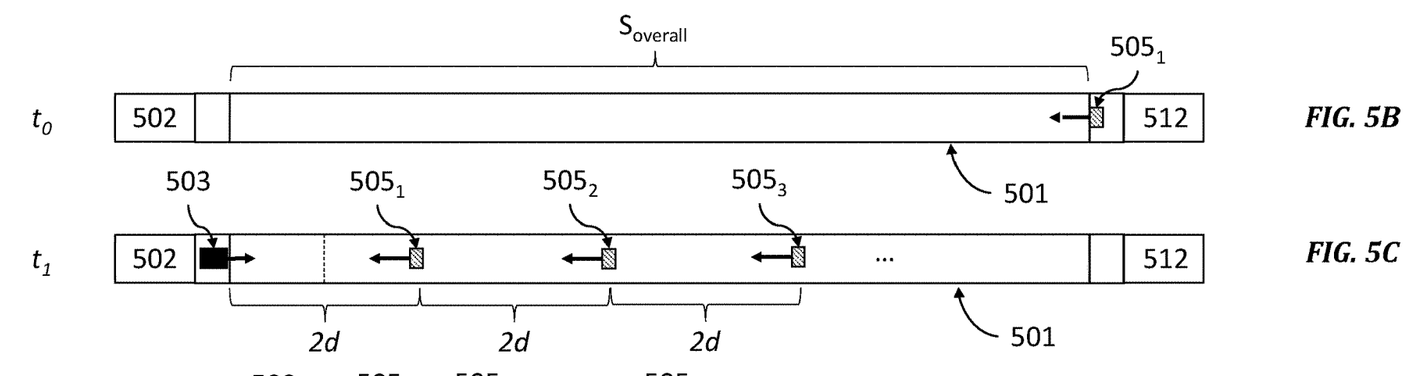
FIGS. 5B-E illustrate the generation of temporary Brillouin gratings at specific locations.

Upon receipt of an instruction to establish a plurality of sensing regions within an overall sensing region ($S_{overall}$) of the optical fiber 501, controller 516 causes the probe laser 512 to inject a first probe laser pulse $505_i$ into one end of the overall sensing region at a time $t_0$, as illustrated in FIG. 5B. Next, controller 516 causes probe laser 512 to inject a second probe laser pulse $505_2$ into the overall sensing region of the optical fiber 501 when the first probe laser pulse $505_1$ is a distance 2d away from the end of the overall sensing region proximate to probe laser 512, where d is the desired separation between Brillouin gratings. Controller 516 continues to cause probe laser 512 to inject probe laser pulses $505_i$ into the optical fiber 501 such that the distance between the probe laser pulses is 2d until a number of injected pulses is equal to the number of desired sensing regions. Controller 516 is further constructed to cause the pump laser 502 to inject a pump laser pulse 503 into the optical fiber 501 at a specific time such that when the pump laser pulse 503 enters the other end of the overall sensing region proximate to pump laser 502, the first probe laser pulse $505_1$ is a distance 2d away from that end of the overall sensing region, as illustrated in FIG. 5C.

Figure 5D:
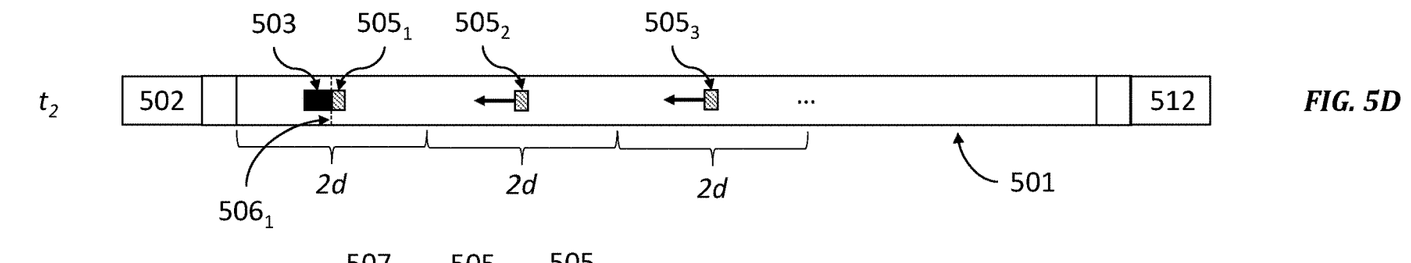
Figure 5E:
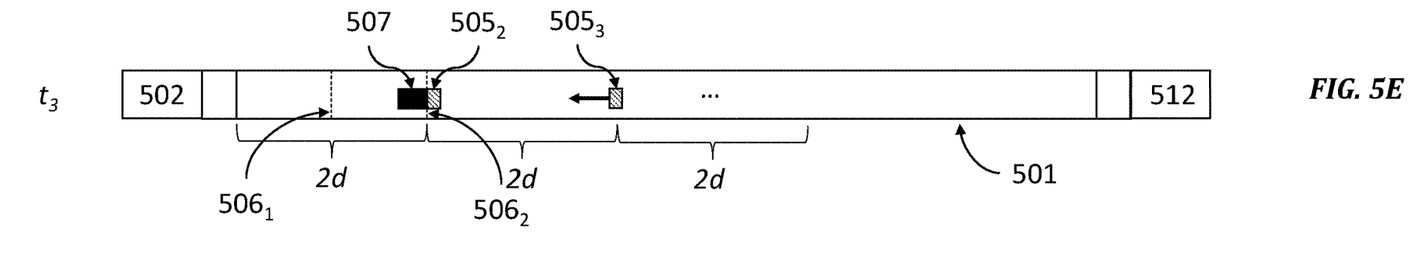

Since the probe laser pulse $505_1$ and the pump laser pulse 503 are moving at substantially the same speed, the probe laser pulse $505_1$ and the pump laser pulse 503 will arrive at a point that is a distance d away from one end of the overall sensing region at a time $t_2$, as illustrated in FIG. 5D. As described above, at the point where the pump laser pulse 503 and probe laser pulse $505_1$ meet, a Brillouin grating $506_1$ is created. While a portion of the pump laser pulse 503 is reflected, some of the pump laser pulse 503 continues to propagate as the residual pump laser pulse 507. At a time $t_3$, the residual pump laser pulse 507 will meet the second probe laser pulse $505_2$ and create a second Brillouin grating $506_2$. This process is repeated for each of the probe laser pulses $505i$ injected into the optical fiber 501, resulting in the creation of a plurality of Brillouin gratings $506_1$ ... $506_n$, where n is the number of probe laser pulses injected into the optical fiber 501. In one exemplary embodiment, a 1 kilometer optical fiber may be divided into 50 sensor regions that are 20 meters apart by using a train of 20 ns prober laser pulses $505_i$ and a 100 ns pump laser pulse, each of which are injected at the right time. The resulting sensor has a 50 kHz bandwidth.

Returning to FIG. 5A, the plurality of Brillouin gratings $506_1$ ... $506_n$ created by the method described above are illustrated. Pump laser pulse 503, or residual pump laser pulse 507 for gratings $506_2$ ... $506_n$, reflect off the gratings $506_1$ ... $506_n$ to create a plurality of reflected signals $509_1$ ... $509_n$. Those reflected signals are returned to a circulator 504 which directs them (along with amplified probe signals $508_1$ ... $508_n$) to a detector 514. In one embodiment, optical processing elements 513 may be provided between the circulator 504 and the detector 514. For example, a path mismatched interferometer may be included to enable demodulation of the relative phase between pump light reflected from neighboring gratings. Alternately, a local oscillator may be introduced to enable coherent detection of the amplitude and phase of the reflected pump light. Controller 516 may perform I/Q processing on the digital signal generated by the detector 514 to generate I/Q data that tracks the changes in magnitude and phase of the recorded signals. Controller 516 may also include processing to extract the acoustic signals at each sensor location. For example, controller 516 may be configured to measure the phase of the reflected signals from each grating relative to a local oscillator (included in controller 516 or provided as one optical processing element 513), the local signal at each sensor position can be recovered by calculating the difference between the phase of reflected pump light from neighboring gratings. In other words, for a reflected signal $509_n$ corresponding to grating 506$_n$, an external source operating on a region of the fiber optic 501 between grating 506$_n$ and 506$_{n-1}$ can be determined by subtracting the phase of signal 509$_{n-1}$ from the phase of signal 509$_n$ using the local oscillator.

Figure 6:
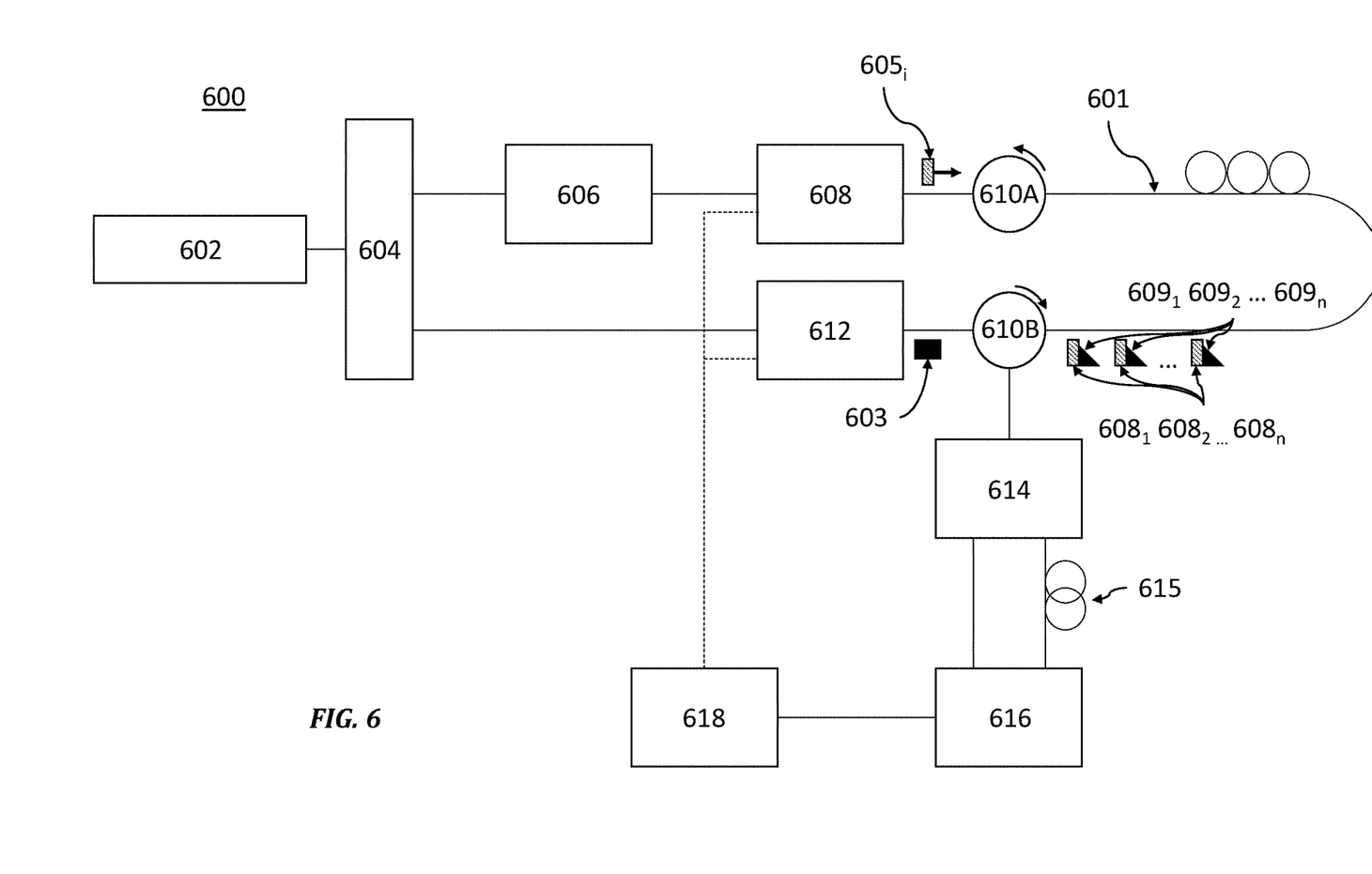
FIG. 6 is a schematic view of another system for acoustic sensing according to yet another embodiment.

FIG. 6 illustrates another system 600 for sensing from a plurality of sensing regions within an optical fiber 601. In FIG. 6, a single laser 602 is used to generate both the pump laser pulse and the probe laser pulses. Laser light from laser 602 is provided to an optical divider 604 which divides the laser 602 into two beams. The first beam is provided to a single sideband modulator 606 which modulates the first beam such that its frequency is reduced by the stimulated Brillouin scattering frequency ($f_{SBS}$). The modulated first beam is then provided to a probe pulse generator 608 which is constructed to generate a plurality of probe laser pulses 605$_i$ in accordance with instructions received from a controller 618 (as indicated by the black dashed lines in FIG. 6). The second beam is provided to a pump pulse generator 612 which is constructed to generate a pump laser pulse 603. Controller 618 controls the probe pulse generator 608 and the pump pulse generator 612 to produce the probe laser pulses 605$_i$ and pump laser pulse 603 at the correct timings (as explained above and in reference to FIGS. 5B-E) so as to create a plurality of temporary Brillouin gratings within the optical fiber 601. The probe laser pulses 605$_i$ are provided to a circulator 610A which, in turn, injects the probe laser pulses 605$_i$ into the optical fiber. The pump laser pulse 603 is provided to a second circulator 610B which, in turn, injects the pump laser pulse 603 into the optical fiber 601. The Brillouin gratings that are created within the optical fiber 601 result in a corresponding number of reflected pump signals 609$_i$ (609$_1$, 609$_2$ . . . 609$_n$ in FIG. 6) that are returned to circulator 610B. Circulator 610B directs the reflected pump signals (as well as the amplified probe signals 608$_1$, 608$_2$, . . . 608$_n$) to, in one embodiment, a 50/50 splitter 614. Splitter 614 divides the received signal into two signals and sends one of those signals into an additional amount of optical fiber 615 so as to create a delay between the two signals. The two signals are then provided to a detector 616 which then provides the corresponding digital signal to controller 618. Like controller 516, controller 618 may perform I/Q processing on the digital signal to generate I/Q data.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An optical fiber sensor, comprising:
an optical fiber;
a laser configured to generate a laser beam;
an optical divider constructed to receive the laser beam and split the laser beam into a first beam and a second beam;
a sideband modulator configured to receive the first beam and generate a modulated first beam by modulating the first beam such that its frequency is reduced by the stimulated Brillouin scattering frequency;
a pump laser pulse generator configured to receive the second beam and generate a pump laser pulse;
a probe laser pulse generator configured to receive the modulated first beam and generate a plurality of probe laser pulses;
a controller constructed to control the pump laser pulse generator and the probe laser pulse generator to inject the pump laser pulse and the plurality of probe laser pulses, respectively, into the optical fiber at specific timings so as to generate a plurality of Brillouin gratings at a predetermined spacing; and
a detector configured to receive reflected pump laser pulses, respectively corresponding to the plurality of Brillouin gratings, and amplified probe laser pulses, respectively corresponding to the plurality of Brillouin gratings, and generate a digital signal corresponding to the reflected pump laser pulses pulses and the amplified probe laser pulses,
wherein a duration of the pump laser pulse is greater than a duration of a probe laser pulse.

2. The optical fiber sensor of claim 1, further comprising:
a circulator configured to receive the reflected pump laser pulses and the amplified probe laser pulses from the optical fiber and provide the reflected pump laser pulses and the amplified probe laser pulses to the detector.

3. The optical fiber sensor of claim 1,
wherein the detector is further configured to provide the digital signal to the controller, and
wherein the controller is further configured to process the digital signal provided by the detector and generate I/Q data.

4. The optical fiber sensor of claim 3, wherein the I/Q data tracks changes in magnitude and phase of the digital signal.

5. The optical fiber sensor of claim 1, wherein the detector is one of: an amplified photodetector, a biased photodetector, a transimpedance photodetector, or a PIN amplified photodetector.

6. The optical fiber sensor of claim 1, wherein a wavelength of the laser beam is between 1530-1565 nanometers, inclusive.

7. The optical fiber sensor of claim 1, wherein a duration of the pump laser pulse is 100 nanoseconds and a duration of a probe laser pulse is 10 nanoseconds.

* * * * *